United States Patent
Danjo

(10) Patent No.: US 12,443,877 B2
(45) Date of Patent: Oct. 14, 2025

(54) CALCULATOR, DEEP LEARNING METHOD AND COMPUTER-READABLE RECORDING MEDIUM STORING PROGRAM FOR DEEP LEARNING

(71) Applicant: FUJITSU LIMITED, Kawasaki (JP)

(72) Inventor: Takumi Danjo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1077 days.

(21) Appl. No.: 17/465,849

(22) Filed: Sep. 3, 2021

(65) Prior Publication Data

US 2022/0172117 A1 Jun. 2, 2022

(30) Foreign Application Priority Data

Dec. 1, 2020 (JP) ................................ 2020-199689

(51) Int. Cl.
*G06N 20/00* (2019.01)
*G06F 9/48* (2006.01)
*G06F 18/21* (2023.01)

(52) U.S. Cl.
CPC ........... *G06N 20/00* (2019.01); *G06F 9/4843* (2013.01); *G06F 18/217* (2023.01)

(58) Field of Classification Search
CPC ...... G06N 20/00; G06F 9/4843; G06F 18/217
See application file for complete search history.

(56) References Cited

U.S. PATENT DOCUMENTS

| 10,679,145 B2 | 6/2020 | Kadav |
| 2018/0032865 A1 | 2/2018 | Nishimura et al. |
| 2019/0102169 A1 | 4/2019 | Yamazaki et al. |

FOREIGN PATENT DOCUMENTS

| JP | 2018-18422 A | 2/2018 |
| JP | 2019-67084 A | 4/2019 |
| WO | 2021/220616 A1 | 11/2021 |

OTHER PUBLICATIONS

Tyagi, S., & Sharma, P. (Aug. 2020). Taming resource heterogeneity in distributed ml training with dynamic batching. In 2020 IEEE International Conference on Autonomic Computing and Self-Organizing Systems (ACSOS) (pp. 188-194). IEEE. (Year: 2020).*
Ye, Q., Zhou, Y., Shi, M., Sun, Y., & Lv, J. (2020). DBS: Dynamic batch size for distributed deep neural network training. arXiv preprint arXiv:2007.11831. (Year: 2020).*
Shi, S., Wang, Q., & Chu, X. (Aug. 2018). Performance modeling and evaluation of distributed deep learning frameworks on gpus. (Year: 2018).*
Elsäsässer, R., & Sauerwald, T. (Jul. 2010). Discrete load balancing is (almost) as easy as continuous load balancing. In Proceedings of the 29th ACM SIGACT-SIGOPS symposium on Principles of distributed computing (pp. 346-354). (Year: 2010).*

(Continued)

*Primary Examiner* — Ann J Lo
(74) *Attorney, Agent, or Firm* — XSENSUS LLP

(57) ABSTRACT

A deep learning method is performed by a computer having a plurality of nodes. The method comprises measuring, in learning performed by using the plurality of nodes in deep learning, performance of each of the nodes, allocating a number of batches to be processed by an entirety of the plurality of nodes to the individual nodes in accordance with the respective performance measured, and processing the allocated batches in each of the nodes.

9 Claims, 19 Drawing Sheets

(56) References Cited

OTHER PUBLICATIONS

Office Action issued on Jul. 30, 2024, in corresponding Japanese patent Application No. 2020-199689, 13 pages.
Qing Ye et al., "DBS: Dynamic Batch Size For Distributed Deep Neural Network Training", Jul. 23, 2020, total 13 pages, https://arxiv.org/abs/2007.11831v1.

* cited by examiner

CALCULATOR, DEEP LEARNING METHOD AND COMPUTER-READABLE RECORDING MEDIUM STORING PROGRAM FOR DEEP LEARNING

CROSS-REFERENCE TO RELATED APPLICATION

This application is based upon and claims the benefit of priority of the prior Japanese Patent Application No. 2020-199689, filed on Dec. 1, 2020, the entire contents of which are incorporated herein by reference.

FIELD

The embodiment discussed herein is related to a computer-readable recording medium storing a program for deep learning, a calculator for the deep learning, and a method for the deep learning.

BACKGROUND

In some cases, programs that use a very large amount of computation for, for example, high performance computing (HPC) or deep learning (DL) perform parallel computation by using nodes such as a plurality of processors or a plurality of calculators because of lack of the amount of computation with a single processor.

U.S. Pat. No. 10,679,145 and Japanese Laid-open Patent Publication Nos. 2018-018422 and 2019-067084 are disclosed as related art.

SUMMARY

According to an aspect of the embodiments, a deep learning method performed by a computer includes measuring, in learning performed by using a plurality of nodes in deep learning, performance of each of the nodes, allocating a number of batches to be processed by an entirety of the plurality of nodes to the individual nodes in accordance with the respective performance measured, and processing the allocated batches in each of the nodes.

The objectives and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Even when a plurality of nodes are prepared with systems configured with the same hardware and software, the processing speed may differ between the nodes by about several percent due to influence of performance variations of processing chips, temperature conditions, and so forth. Thus, in the case where the completion of a first process in all the nodes is waited and a second process is performed in each of the nodes after the first process has been executed in each of the nodes, processing performance may be degraded due to the generation of the standby time.

In one aspect, an objective is to decrease standby time until the start of sharing of processing results between nodes in parallel computation.

[A] RELATED EXAMPLE

Figure 1:
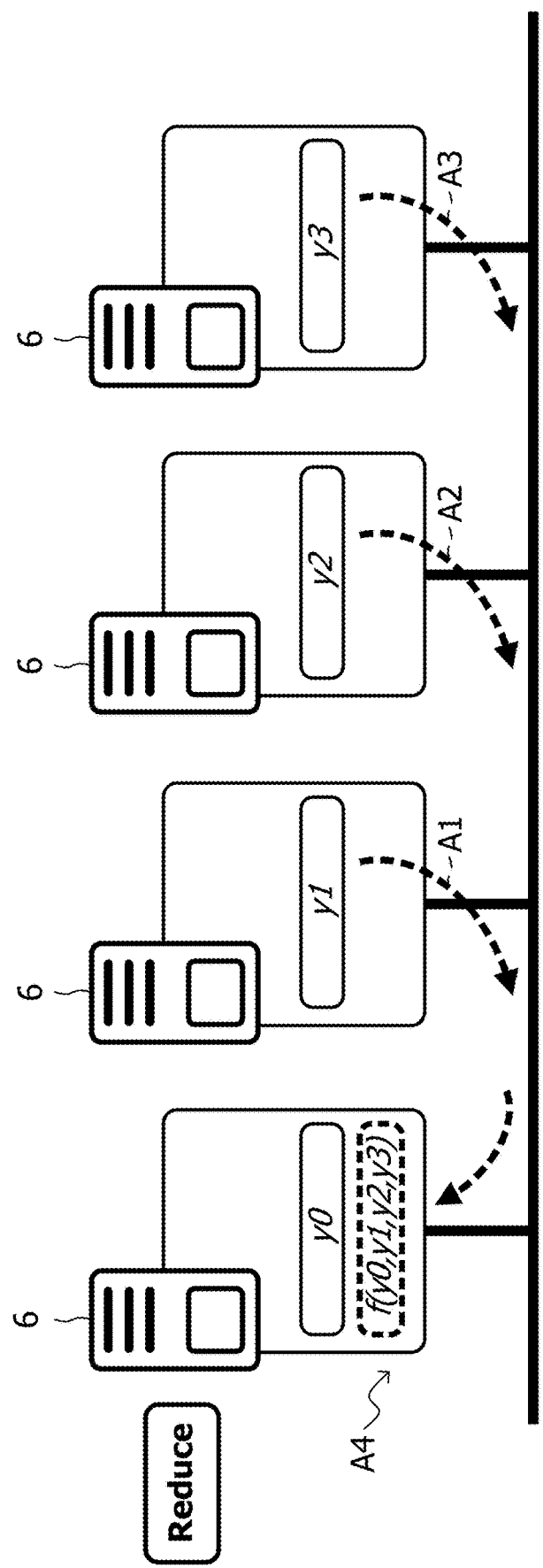
FIG. 1 is a diagram explaining a reduce process in a related example.

FIG. 1 is a diagram explaining a reduce process in a related example.

There is a message passing interface (MPI) as a standard for using parallel computation. The reduce process is, in the implementation of MPI, a process of reducing values of a plurality of nodes 6 into a single value by using a certain function as illustrated in FIG. 1.

As exemplified in FIG. 1, it is assumed that four nodes 6 have values of y0, y1, y2, y3, respectively. When the reduce process is executed, the values are reduced as indicated by reference signs A1 to A3, and a single value is calculated by a function f(y0, y1, y2, y3) such as addition, multiplication, max, or min as indicated by a reference sign A4.

Figure 2:
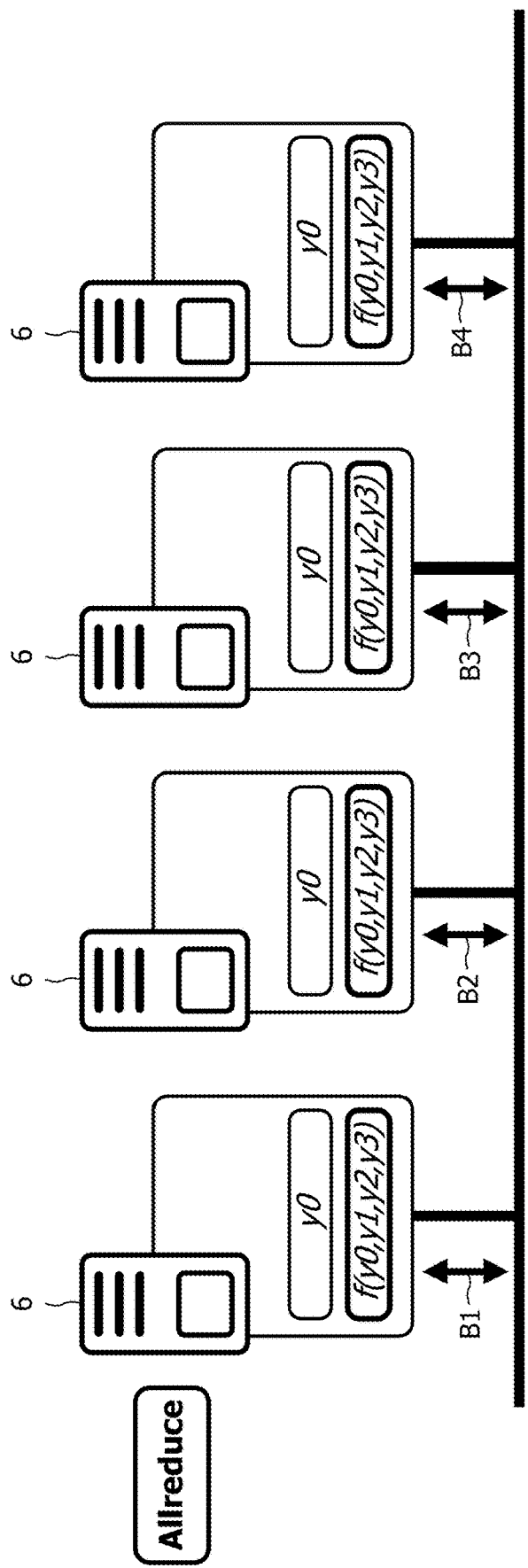
FIG. 2 is a diagram explaining an allreduce process in the related example.

FIG. 2 is a diagram explaining an allreduce process in the related example.

The allreduce process is a process that causes a result of the reduce process to be shared by all the nodes 6.

In the example illustrated in FIG. 2, as indicated by reference signs B1 to B4, the function f (y0, y1, y2, y3) is shared by all the nodes 6.

Figure 3:
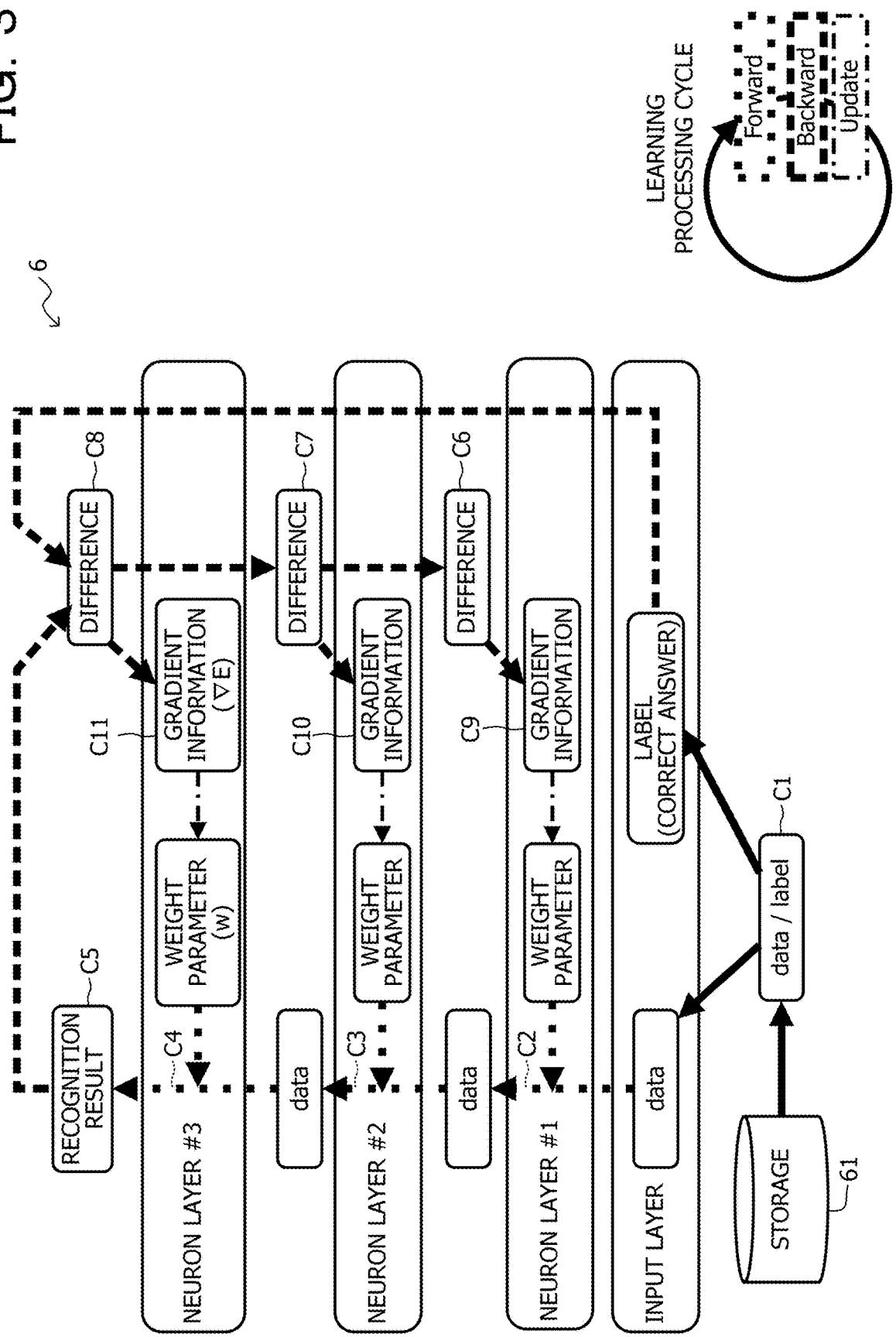
FIG. 3 is a diagram explaining a first detailed example of the reduce process in the related example.

FIG. 3 is a diagram explaining a first detailed example of the reduce process in the related example.

When deep learning (DL) is performed in a node 6, data and a label (for example, a correct answer) are input from a storage 61 to an input layer as indicated by a reference sign C1.

In FIG. 3, dotted arrows indicate a forward process in a learning processing cycle, dashed arrows indicate backward process in the learning processing cycle, and a dot-dash arrows indicate an update process in the learning processing cycle.

As indicated by a reference sign C2, in a neuron layer #1, as the forward process, a weight parameter w is applied to the data from the input layer. As indicated by a reference sign C3, in a neuron layer #2, as the forward process, the weight parameter w is applied to the data from the neuron layer #1. As indicated by a reference sign C4, in a neuron layer #3, as the forward process, the weight parameter w is applied to the data from the neuron layer #2.

As indicated by a reference sign C5, as the forward process, output of the neuron layer #3 is obtained as a recognition result.

As indicated by reference signs C6 to C8, in each of the neuron layers #1 to #3, as the backward process, the difference between the label and recognition result is input.

As indicated by reference signs C9 to C11, as the update process, the difference having been input in each of the neuron layers #1 to #3 is applied to the weight parameter w as gradient information $\nabla E$.

When the above-described cycle is repeated many times, appropriate weight parameter is obtained.

Figure 4:
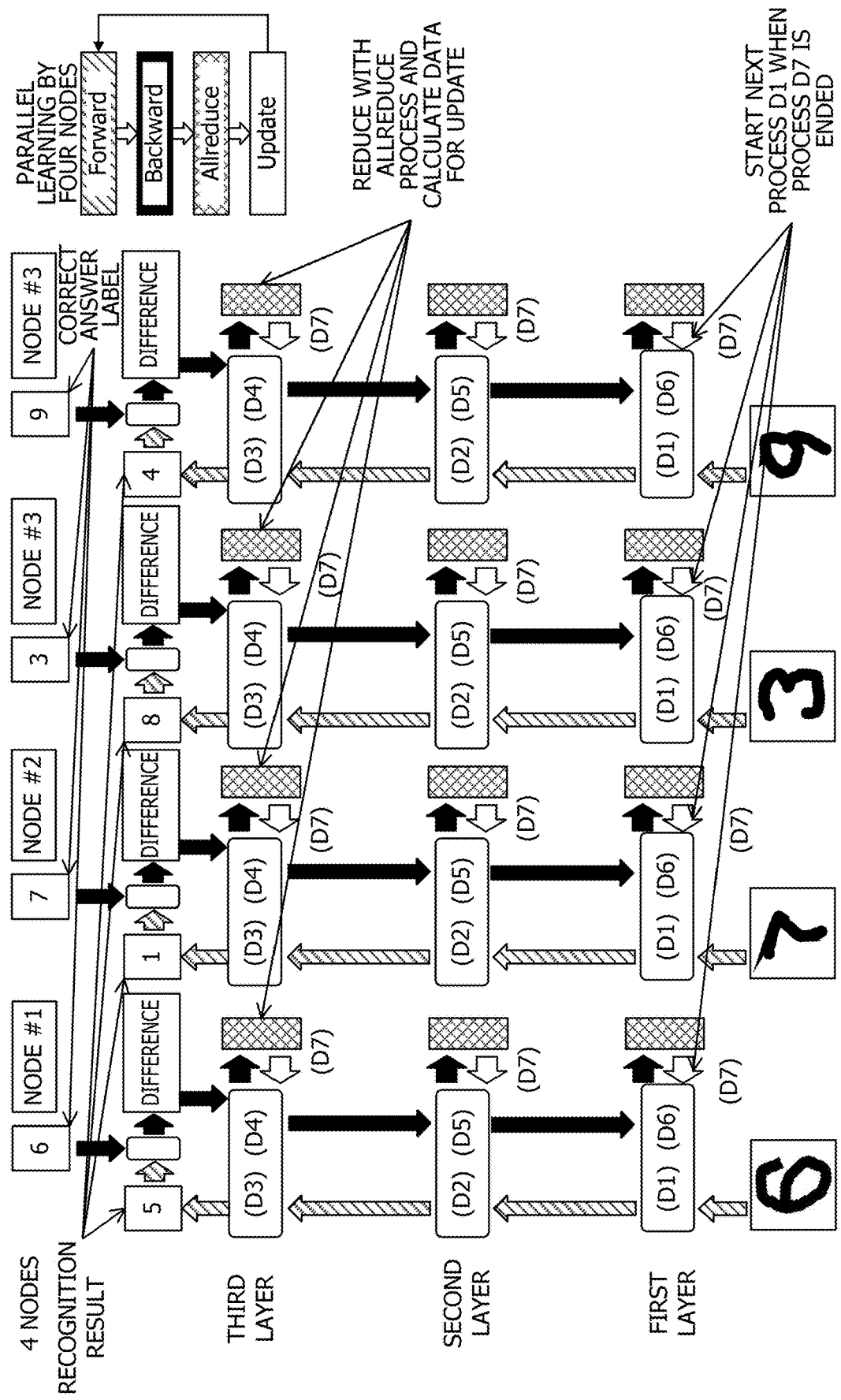
FIG. 4 is a diagram explaining a second detailed example of the reduce process in the related example.

FIG. 4 is a diagram explaining a second detailed example of the reduce process in the related example.

In FIG. 4, hatched arrows indicate the forward process, filled arrows indicate the backward process, hatched blocks indicate the allreduce process, and blank arrows indicate the update process.

When handwritten numbers "6", "7", "3", and "9" are respectively input to nodes #1 to #4, the forward process is performed in each of first to third layers as indicated by reference signs D1 to D3.

In the example illustrated in FIG. 4, "5", "1", "8", and "4" are output as recognition results from the third layers in the nodes #1 to #4, respectively. The differences between the recognition results and the correct answer label are calculated, and the backward process is performed in each of the third to first layers as indicated by reference signs D4 to D6.

As indicated by a reference sign D7, in each of the layers, the differences are reduced by the allreduce process, data for update is calculated, and the update process is performed.

When the process indicated by the reference sign D7 end, processes indicated by reference signs D1 and after are started for the next input.

Figure 5:
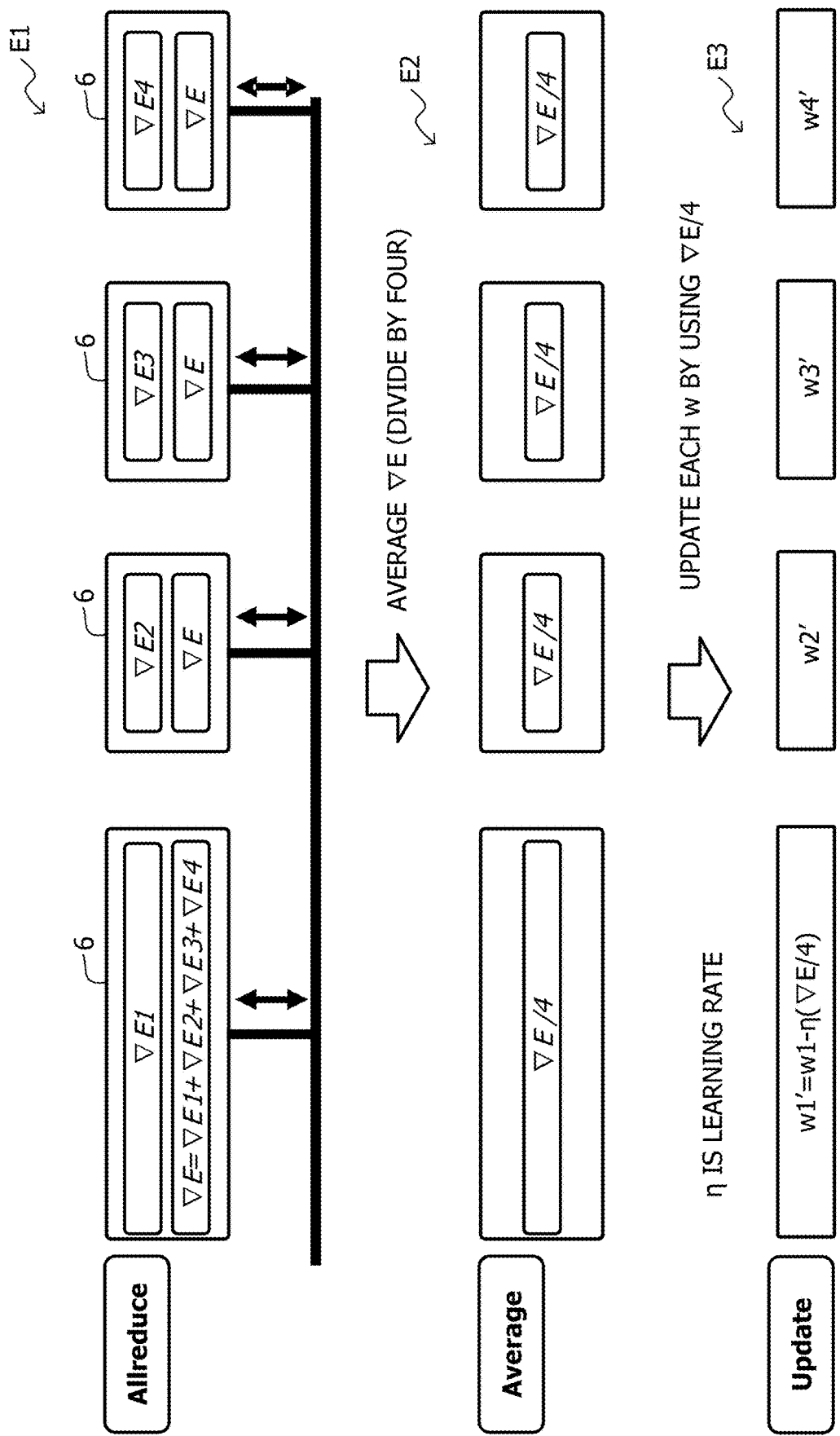
FIG. 5 is a diagram explaining a third detailed example of the reduce process in the related example.

FIG. 5 is a diagram explaining a third detailed example of the reduce process in the related example.

In a distribution process for the DL, the gradient information of all the nodes 6 is added together, and the added value is distributed to each of the nodes 6. After that, the value is divided by the number of nodes to obtain an average, and then, a weight is updated in each of the nodes.

In the example illustrated in FIG. 5, as indicated by reference sign E1, $\nabla E = \nabla E1 + \nabla E2 + \nabla E3 + \nabla E4$ is calculated in each of the nodes by the allreduce process.

As indicated by a reference sign E2, $\nabla E$ is averaged by dividing $\nabla E$ by four in each of the nodes by an average process.

As indicated by a reference sign E3, the weight parameter w is updated by using $\nabla E/4$ in each of the nodes by the update process.

For example, when a learning rate is q, the updated weight parameter with respect to a weight parameter w1 before the update is calculated as $w1' = w1 - \eta(\nabla E/4)$.

Figure 6:
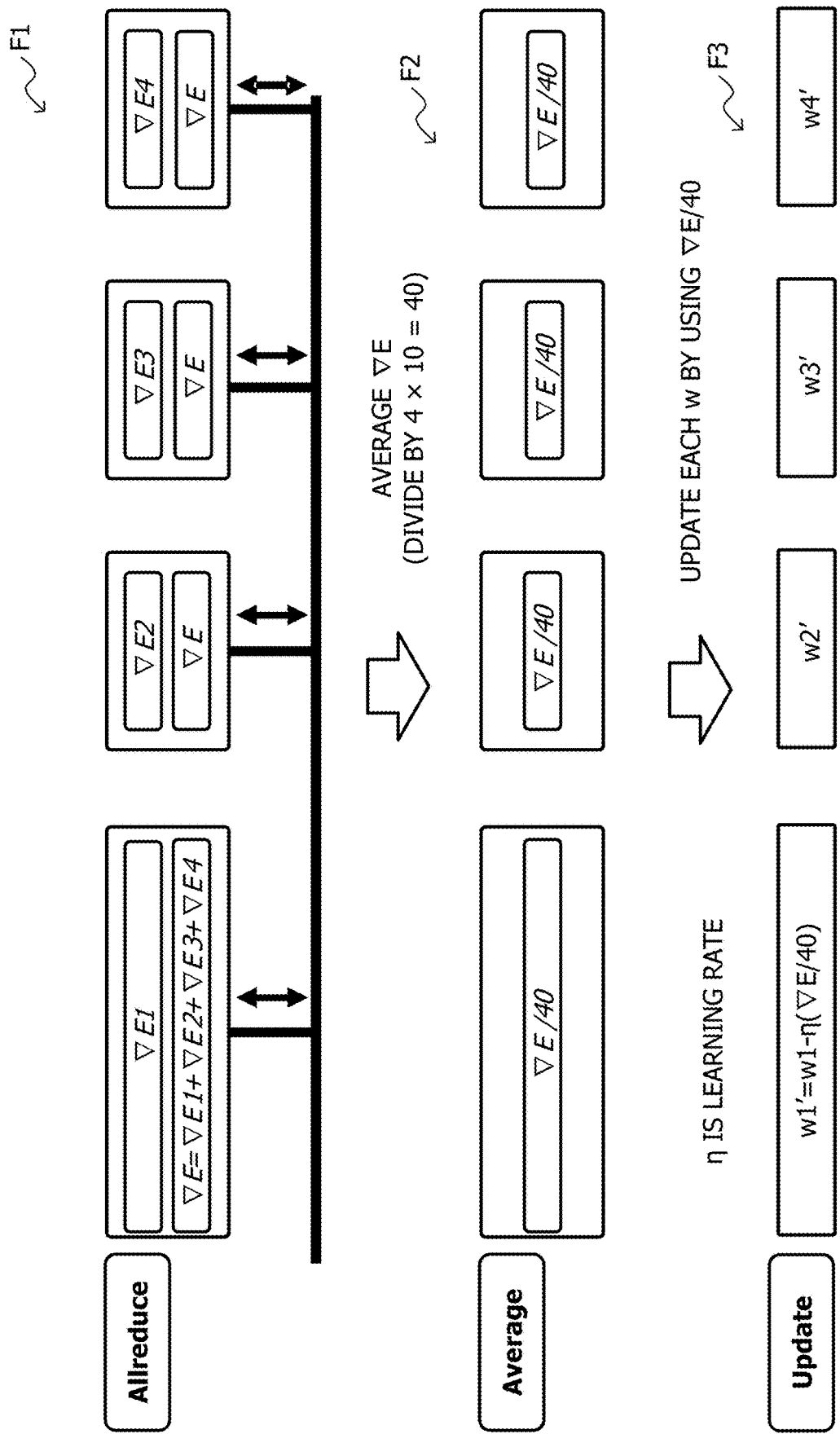
FIG. 6 is a diagram explaining a fourth detailed example of the reduce process in the related example.

FIG. 6 is a diagram explaining a fourth detailed example of the reduce process according to the related example.

In the distribution process for the DL, a mini-batch method may be used. In the mini-batch method, in each of the nodes 6, a plurality of mini-batches are processed instead of processing batches one by one.

In the example illustrated in FIG. 5, the number of mini-batches in each of the nodes 6 is 10, and the global batch size in the four nodes 6 is 40.

As indicated by a reference sign F1, $\nabla E = \nabla E1 + \nabla E2 + \nabla E3 + \nabla E4$ is calculated in each of the nodes by the allreduce process.

As indicated by a reference sign F2, $\nabla E$ is averaged by dividing $\nabla E$ by $4*10=40$ in each of the nodes by the average process.

As indicated by a reference sign F3, the weight parameter w is updated by using $\nabla E/40$ in each of the nodes by the update process.

For example, when the learning rate is $\eta$, the updated weight parameter with respect to the weight parameter w1 before the update is calculated as $w1' = w1 - \eta(\nabla E/40)$.

Figure 7:
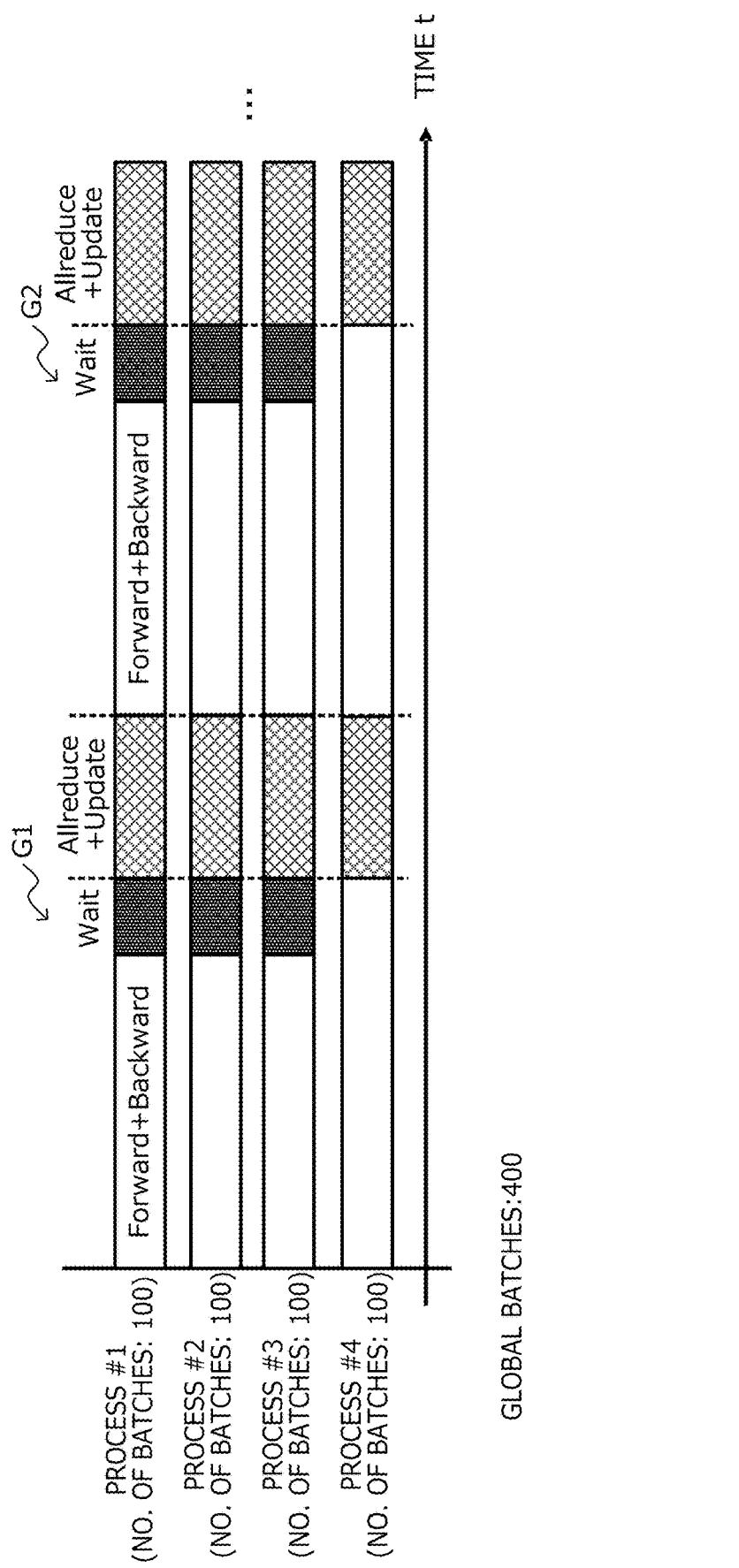
FIG. 7 is a diagram explaining a wait for timing in the allreduce process in the related example.

FIG. 7 is a diagram explaining a wait for timing in the allreduce process in the related example.

Even when a system in which a plurality of nodes are configured with the same hardware and software is prepared, processing speed may differ between the nodes by about several percent due to influence of performance variations of processing chips, temperature conditions, and so forth.

For example, the processing speed of a central processing unit (CPU) or a graphics processing unit (GPU) may vary due to automatic variation of an operation clock depending on the temperature.

In the allreduce process, basically, communication is performed after a single gradient calculation of all the processes has been completed. Thus, the processing performance is degraded corresponding to the standby time.

In the example illustrated in FIG. 7, the number of batches of 100 is allocated to all processes #1 to #4, and the number of global batches is 400. In consideration of processing in a multi-CPU or a multi-GPU using multi-processing, the unit of processing is a process hereafter.

As indicated by reference signs G1 and G2, time taken for the forward process+the backward process in the processes #1 to #3 is shorter than the time taken for the forward process+the backward process in the process #4. Thus, a wait time until the start of the allreduce process+the update process is generated in the processes #1 to #3 (for example, until the completion of the forward process+the backward process in the process #4).

[B] EMBODIMENT

Hereinafter, an embodiment will be described with reference to the drawings. The following embodiment is merely exemplary and is in no way intended to exclude various modification examples or technical applications that are not explicitly described in the embodiment. For example, the present embodiment may be implemented with various modifications without departing from the gist of the present embodiment. Each of the drawings is not intended to indicate that only the drawn elements are provided, and the embodiment may include other functions and so on.

The same reference signs denote the same or similar elements in the drawings, thereby the description thereof is omitted.

[B-1] Example of Configuration

Figure 8:
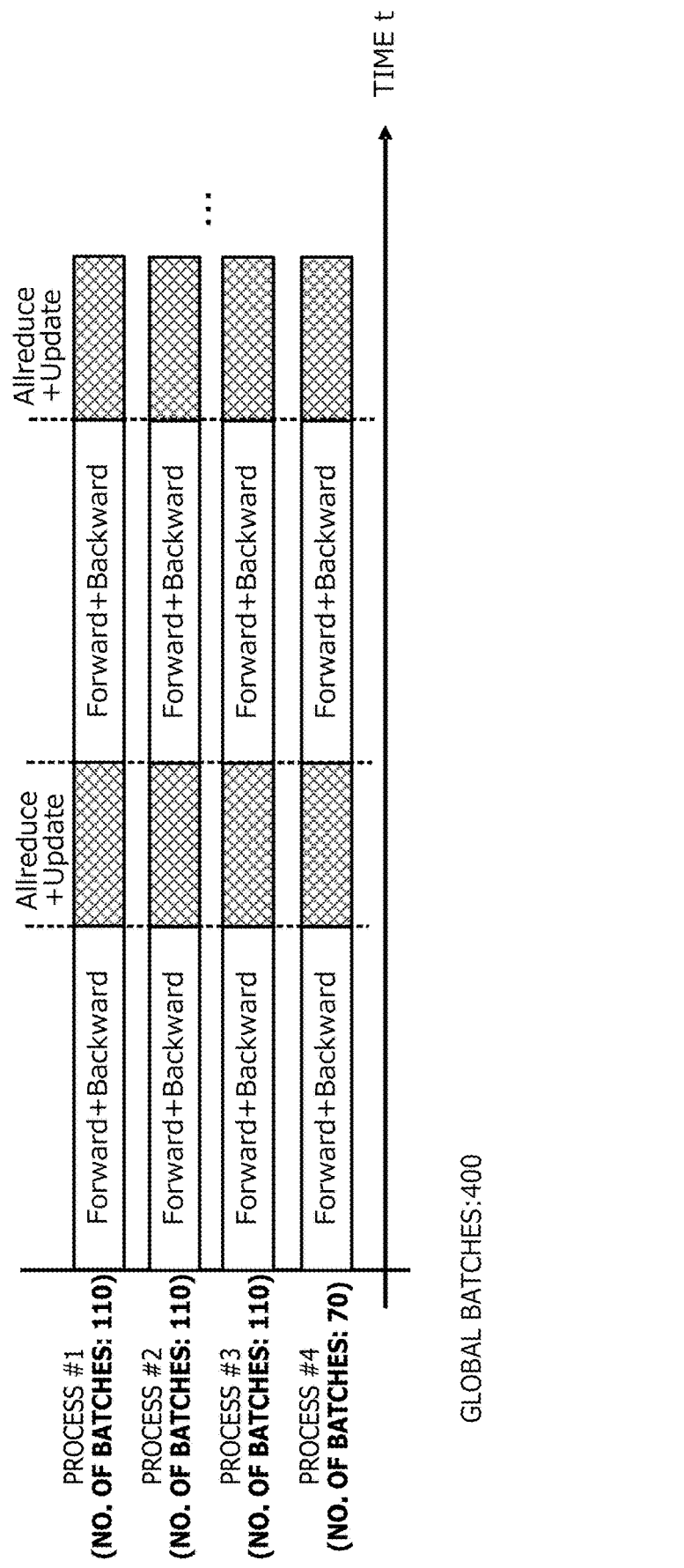
FIG. 8 is a diagram explaining an optimization process for the number of batches in an example according to the embodiment.

FIG. 8 is a diagram explaining an optimization process for the number of batches in an example according to the embodiment.

In the example according to the embodiment, processing time is smoothed by distributing the number of batches in accordance with the performance of each of the processes. Since the number of global batches is not changed, learning is not influenced even when the learning rate is not changed.

In an example illustrated in FIG. 8, the number of batches of 110 is distributed to each of the processes #1 to #3, and the number of batches of 70 is distributed to the process #4. Thus, in each of the processes, no wait time is generated from the end of the forward process+the backward process to the start of the allreduce process+the update process.

Figure 9:
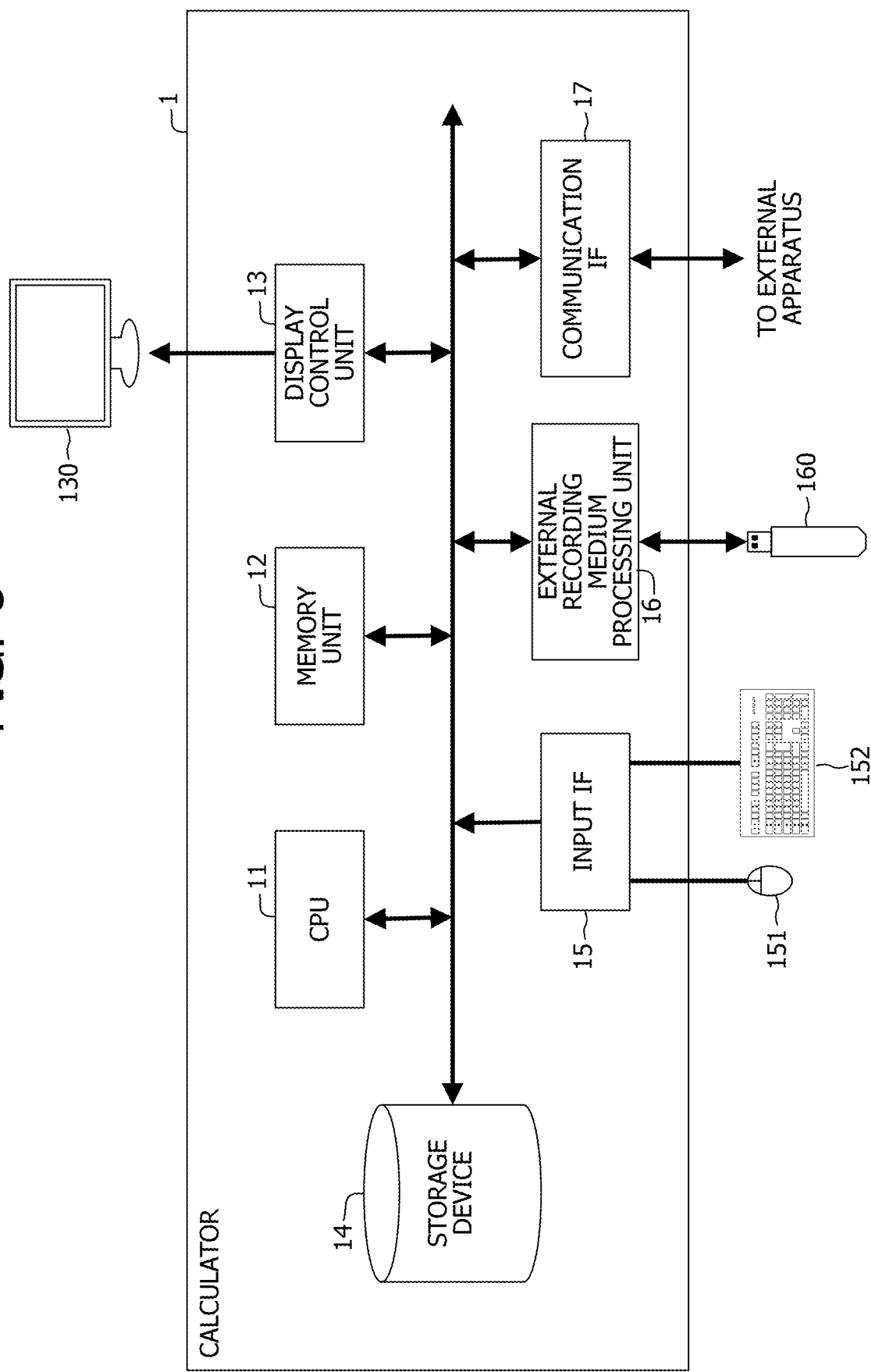
FIG. 9 is a block diagram schematically illustrating an example of a hardware configuration of a calculator in the example according to the embodiment.

FIG. 9 is a block diagram schematically illustrating an example of a hardware configuration of a calculator 1 in the example according to the embodiment.

As illustrated in FIG. 9, the calculator 1 has a server function and includes a CPU 11, a memory unit 12, a display control unit 13, a storage device 14, an input interface (IF) 15, an external recording medium processing unit 16, and a communication IF 17. A plurality of calculators 1 may be provided as the nodes 6 as illustrated in FIGS. 1 and 2, and parallel computation may be executed in such the plurality of calculators 1. The calculator 1 may include a plurality of CPUs 11, and parallel computation may be executed in such the plurality of the CPUs 11.

The memory unit 12 is an example of a storage unit and includes, for example, a read-only memory (ROM), a random-access memory (RAM), and so forth. Programs such as a Basic Input/Output System (BIOS) may be written in the ROM of the memory unit 12. Software programs written in the memory unit 12 may be appropriately loaded into and executed by the CPU 11. The RAM of the memory unit 12 may be used as a memory for temporary recording or as a working memory.

The display control unit 13 is coupled to a display device 130 and controls the display device 130. The display device 130 is a liquid crystal display, an organic light-emitting diode (OLED) display, a cathode ray tube (CRT), an electronic paper display, or the like and displays various types of information for, for example, an operator. The display device 130 may be combined with an input device. For example, the display device 130 may be a touch panel.

The storage device 14 is a storage device with high IO performance. For example, dynamic random-access memory (DRAM), a solid-state drive (SSD), storage class memory (SCM), or a hard disk drive (HDD) may be used as the storage device 14.

The input IF 15 may be coupled to input devices such as a mouse 151 and a keyboard 152 and control the input devices such as a mouse 151 and a keyboard 152. The mouse 151 and the keyboard 152 are examples of the input device. The operator performs various input operations by using these input devices.

The external recording medium processing unit 16 is configured so that a recording medium 160 is attachable to the external recording medium processing unit 16. The external recording medium processing unit 16 is configured to be able to read information recorded in the recording medium 160 in a state in which the recording medium 160 is attached to the external recording medium processing unit 16. In the present example, the recording medium 160 is portable. For example, the recording medium 160 is a flexible disk, an optical disk, a magnetic disk, a magneto-optical disk, a semiconductor memory, or the like.

The communication IF 17 is an interface that enables communication with an external apparatus.

The CPU 11 is an example of a processor and is a processing device that performs various controls and operations. The CPU 11 executes an operating system (OS) and the programs loaded into the memory unit 12 to realize various functions.

A device for controlling operation of the entire calculator 1 is not limited to the CPU 11 but may be, for example, any one of a microprocessor unit (MPU), a digital signal processor (DSP), an application-specific integrated circuit (ASIC), a programmable logic device (PLD), and a field-programmable gate array (FPGA). The device for controlling the operation of the entire calculator 1 may be a combination of two or more of a CPU, an MPU, a DSP, an ASIC, a PLD, and an FPGA.

Figure 10:
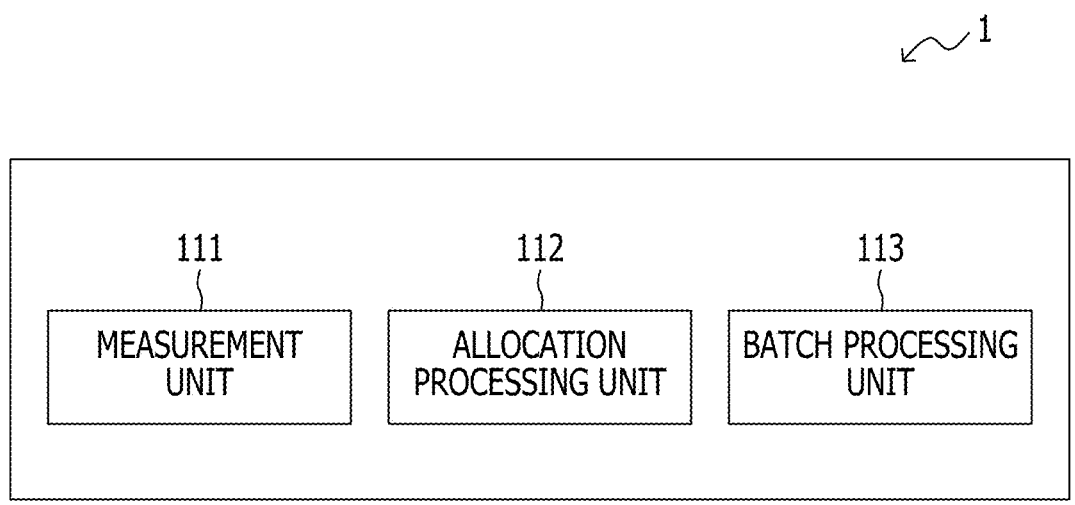
FIG. 10 is a block diagram schematically illustrating an example of a software configuration of the calculator illustrated in FIG. 9.

FIG. 10 is a block diagram schematically illustrating an example of a software configuration of the calculator 1 illustrated in FIG. 9.

The calculator 1 functions as a measurement unit 111, an allocation processing unit 112, and a batch processing unit 113.

The measurement unit 111 measures the performance (for example, a throughput) of each of the nodes as a single unit. The details of processing performed by the measurement unit 111 will be described later with reference to, for example, FIG. 11.

The allocation processing unit 112 allocates the number of batches for the entirety of the nodes to the individual nodes in accordance with the performance. The details of processing performed by the allocation processing unit 112 will be described later with reference to, for example, FIG. 12.

The batch processing unit 113 processes the batches allocated to the individual nodes. The details of processing performed by the batch processing unit 113 will be described later with reference to, for example, FIG. 13.

Figure 11:
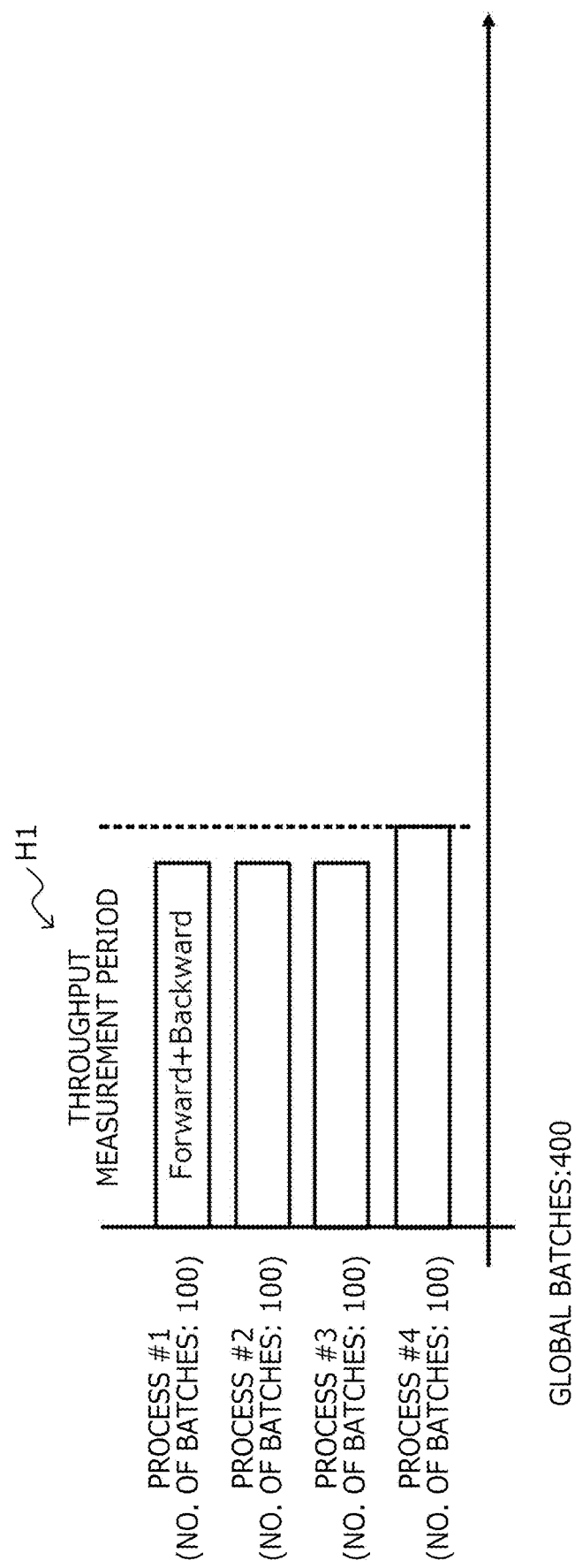
FIG. 11 is a diagram explaining a throughput measurement process in the calculator illustrated in FIG. 9.

FIG. 11 is a diagram explaining a throughput measurement process in the calculator 1 illustrated in FIG. 9.

The measurement unit 111 measures the performance of each of the discrete processes. For example, the quantity able to be processed in a certain period of time T (may be an appropriate period of time, the number of repetitions, or the number of epochs) by running learning to be performed may be calculated as the throughput.

In the measurement process, it is not desired to perform communication between the nodes or update the weight parameter. The number of batches may be large to some extent in order to obtain the maximum speed.

In an example illustrated in FIG. 11, the number of batches is set to 100 in each of the processes #1 to #4. However, as indicated by a reference sign H1, in a throughput measurement period, the processing time of the forward process+the backward process in the processes #1 to #3 is calculated to be shorter than the processing time of the forward process+the backward process in the process #4.

Figure 12:
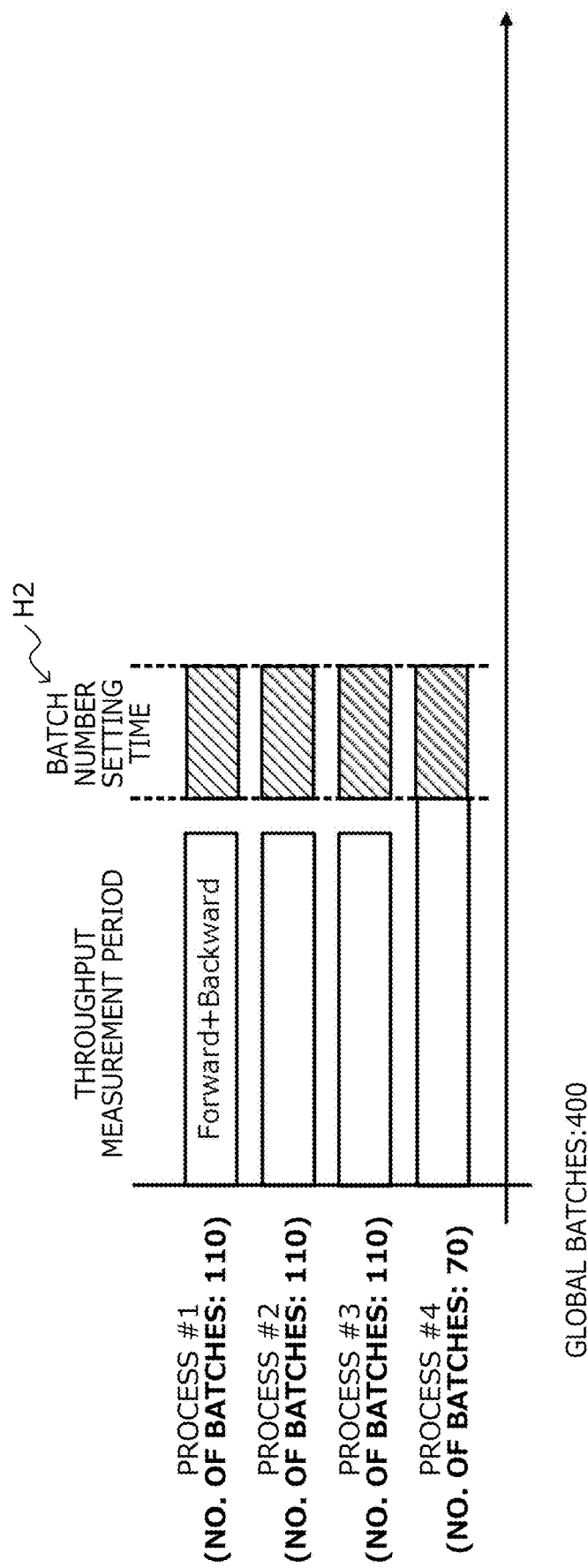
FIG. 12 is a diagram explaining a batch-number setting process in the calculator illustrated in FIG. 9.

FIG. 12 is a diagram explaining a batch-number setting process in the calculator 1 illustrated in FIG. 9.

Next, the allocation processing unit 112 allocates the mini-batches to the individual processes by the numbers in accordance with the ratio of the throughputs of the processes with the number of global batches used a setting value. For example, when the number of global batches is 400 and the ratio of the throughputs in the 4 processes is 11:11:11:7, the ratio of the numbers of mini-batches in the individual processes is 110:110:110:70. When the number of mini-batches is not able to be distributed to the processes with integers, for example, the number of global batches is not necessarily changed by limiting the distribution ratio of the mini-batches to a divisor of the number of the global batches.

In an example illustrated in FIG. 12, the number of batches is allocated in a batch number setting period.

Figure 13:
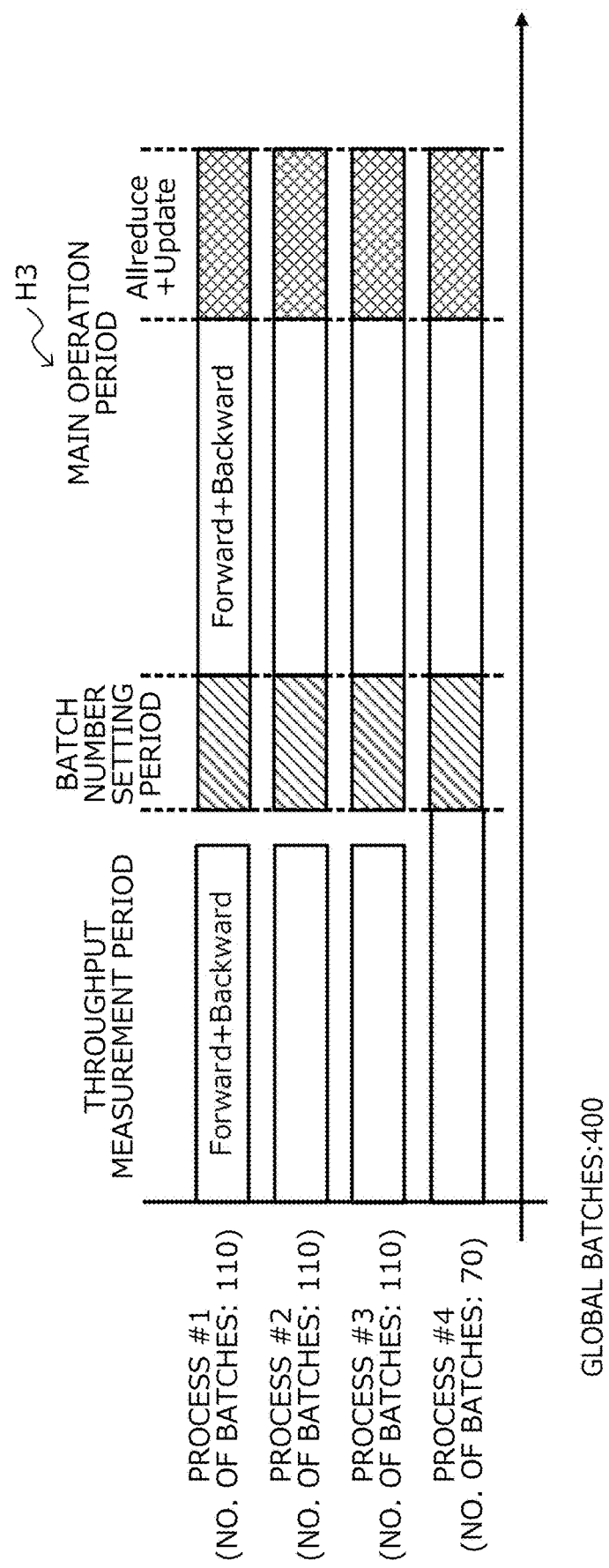
FIG. 13 is a diagram explaining a main operation of a batch process in the calculator illustrated in FIG. 9.

FIG. 13 is a diagram explaining a main operation of a batch process in the calculator 1 illustrated in FIG. 9.

The batch processing unit 113 causes the processes to run in accordance with the batch sizes set by the allocation processing unit 112 and starts parallel learning. Thus, there is no standby period of the allreduce process in a main operation period, and accordingly, learning may be efficiently performed.

In an example illustrated in FIG. 13, as indicated by a reference sign H3, in each of the processes #1 to #4, the allreduce process+the update process may be executed without a wait time after the forward process+the backward process in the main operation period.

[B-2] Example of Operation

Figure 14:
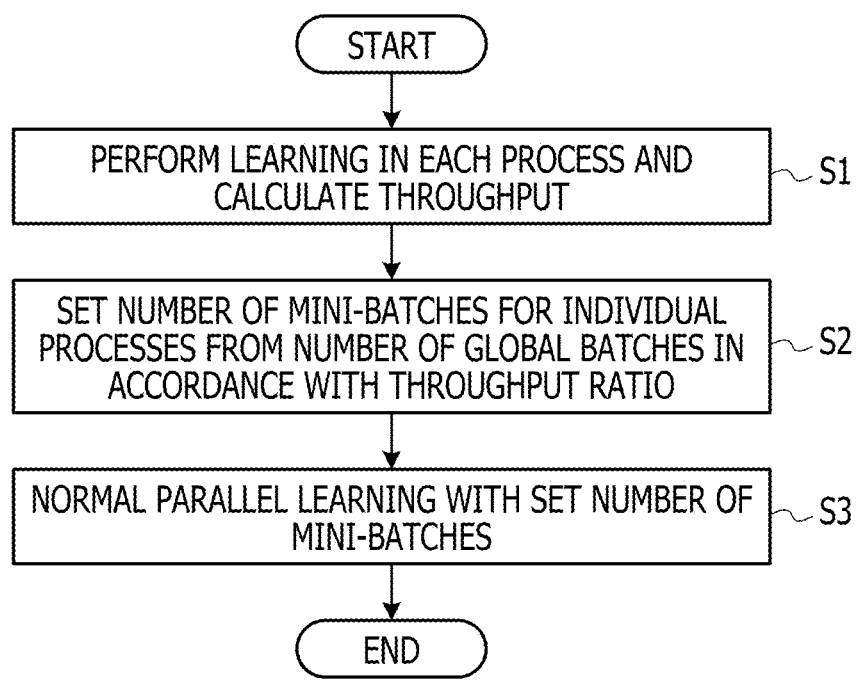
FIG. 14 is a flowchart explaining the batch process in the example according to the embodiment.

The batch process in the example according to the embodiment will be described with reference to a flowchart (steps S1 to S3) illustrated in FIG. 14.

The measurement unit 111 performs learning in each of the processes and calculates the throughputs (step S1).

The allocation processing unit 112 sets the numbers of mini-batches for the individual processes from the number of global batches in accordance with the ratio of the throughputs (step S2).

The batch processing unit 113 executes normal parallel learning in each of the processes with the set numbers of mini-batches (step S3). Then, the batch process ends.

[C] FIRST MODIFICATION EXAMPLE

Figure 15:
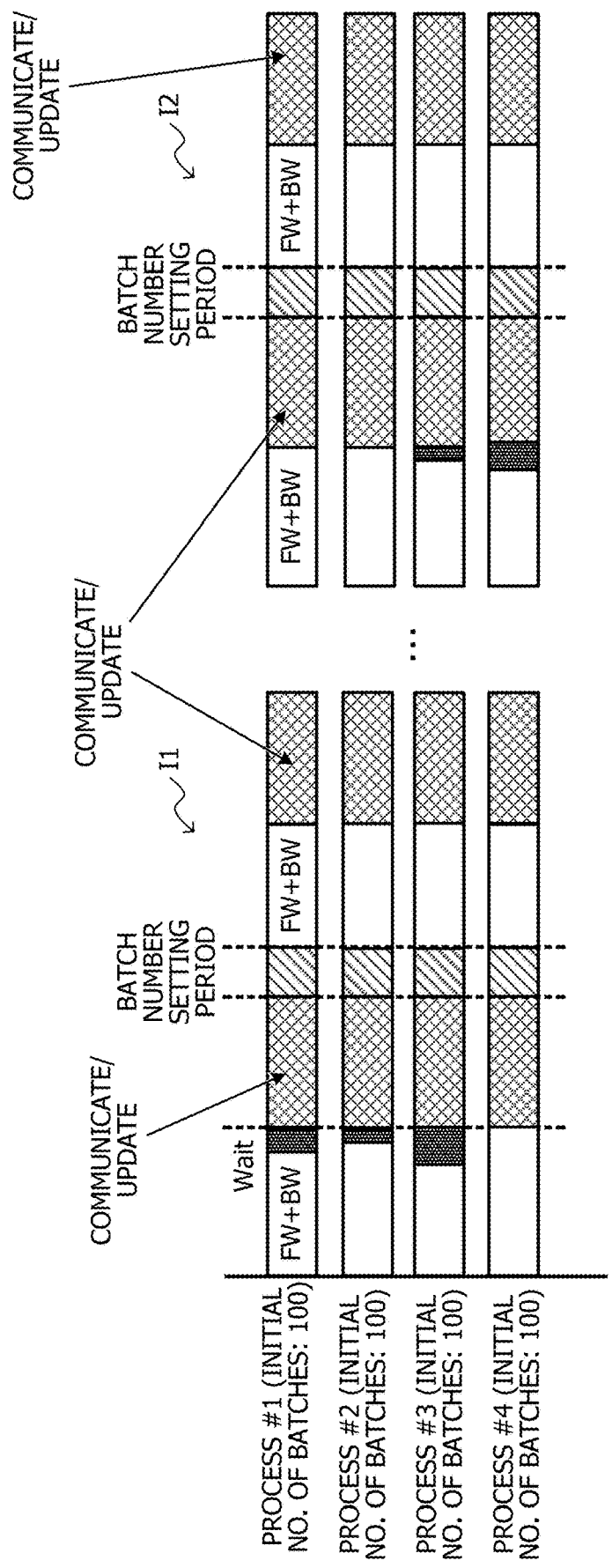
FIG. 15 is a diagram explaining the optimization process for the number of batches as a first modification example.

FIG. 15 is a diagram explaining the optimization process for the number of batches as a first modification example.

Depending on the temperature of CPU 11, a usage status of the calculator 1, and so forth, the throughput in each of the processes may change over time.

In an example illustrated in FIG. 15, as indicated by a reference sign I1, since the wait time is generated from the completion of the forward process+the backward process to the start of the communication process/update process in the processes #1 to #3, the processing time is smoothed by setting the number of batches. However, as indicated by a reference sign I2, the wait time is generated from the completion of the forward process+the backward process to the start of the communication process/update process in the processes #3 and #4 over time.

Thus, according to the first modification example, the actual throughput of each of the processes may be measured every time the learning is repeated once or a plurality of number of times or every time a predetermined period of time elapses, thereby to change the number of batches allocated to each of the processors.

Figure 16:
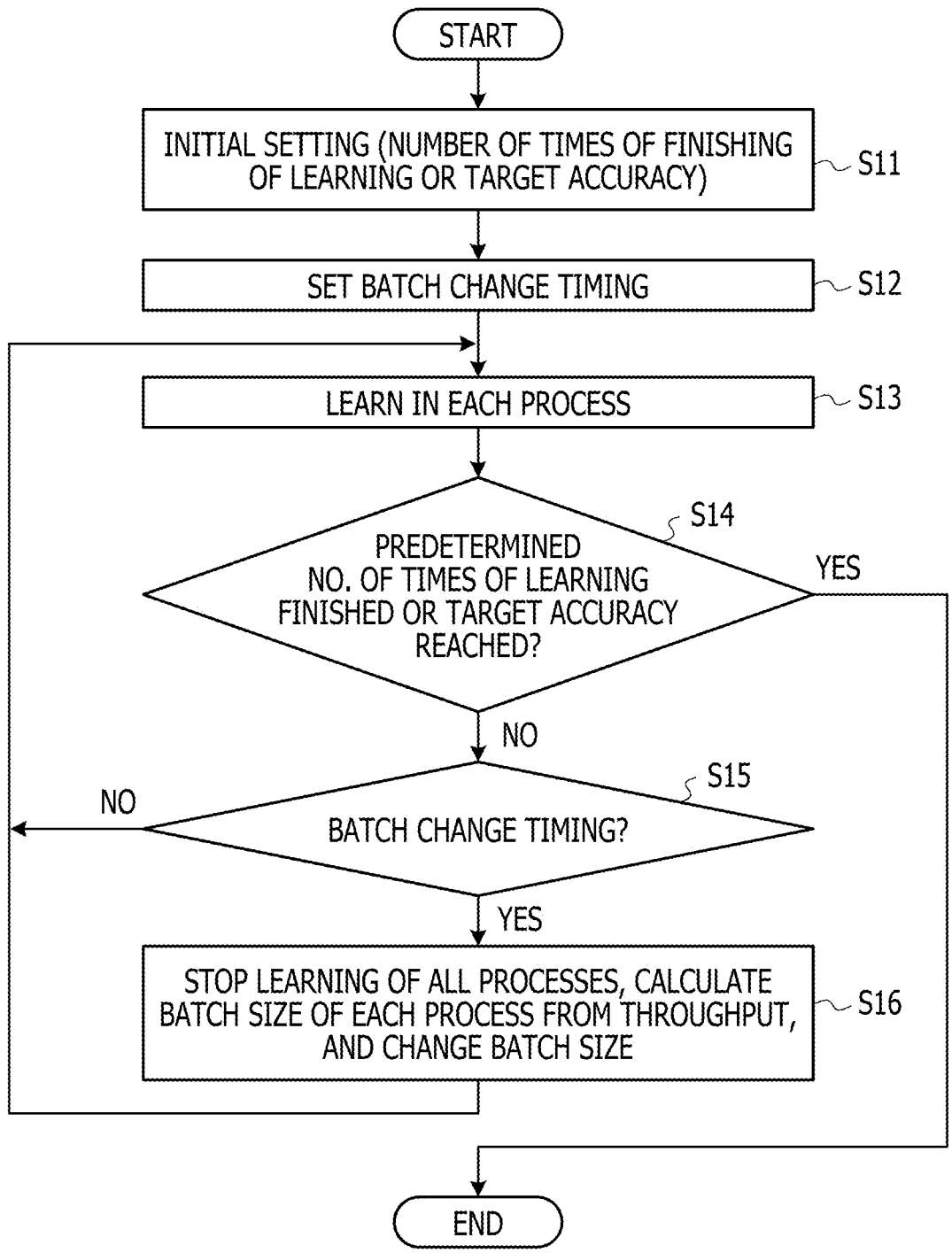
FIG. 16 is a flowchart explaining the optimization process for the number of batches as the first modification example.

The optimization process for the number of batches as the first modification example will be described with reference to a flowchart (steps S11 to S16) illustrated in FIG. 16.

The batch processing unit 113 performs initial setting of, for example, the number of times of learning process or target accuracy (step S11).

The allocation processing unit 112 sets batch change timing (step S12). The batch change timing may be reached every time the number of times of repetitions of learning reaches, for example, 100 times, every time the length of time of the learning reaches, for example, 30 minutes, or timing at which the wait time exceeds a threshold.

The batch processing unit 113 performs the learning in each of the processes (step S13).

The batch processing unit 113 determines whether the learning has been performed a predetermined number of times or target accuracy has been reached (step S14).

When the learning has been performed the predetermined number of times or the target accuracy has been reached (see a YES route in step S14), the optimization process for the number of batches as the first modification example ends.

In contrast, when the learning has not been performed the predetermined number of times and the target accuracy has not been reached (see a NO route in step S14), the allocation processing unit 112 determines whether the batch change timing has been reached (step S15).

When the batch change timing has not been reached (see a NO route in step S15), the processing returns to step S13.

In contrast, when the batch change timing has been reached (see a YES route in step S15), the allocation processing unit 112 stops the learning of all the processes, calculates the batch size of each of the processes from the throughput, and changes the batch size (step S16). Then, the processing returns to step S13.

[D] SECOND MODIFICATION EXAMPLE

Figure 17:
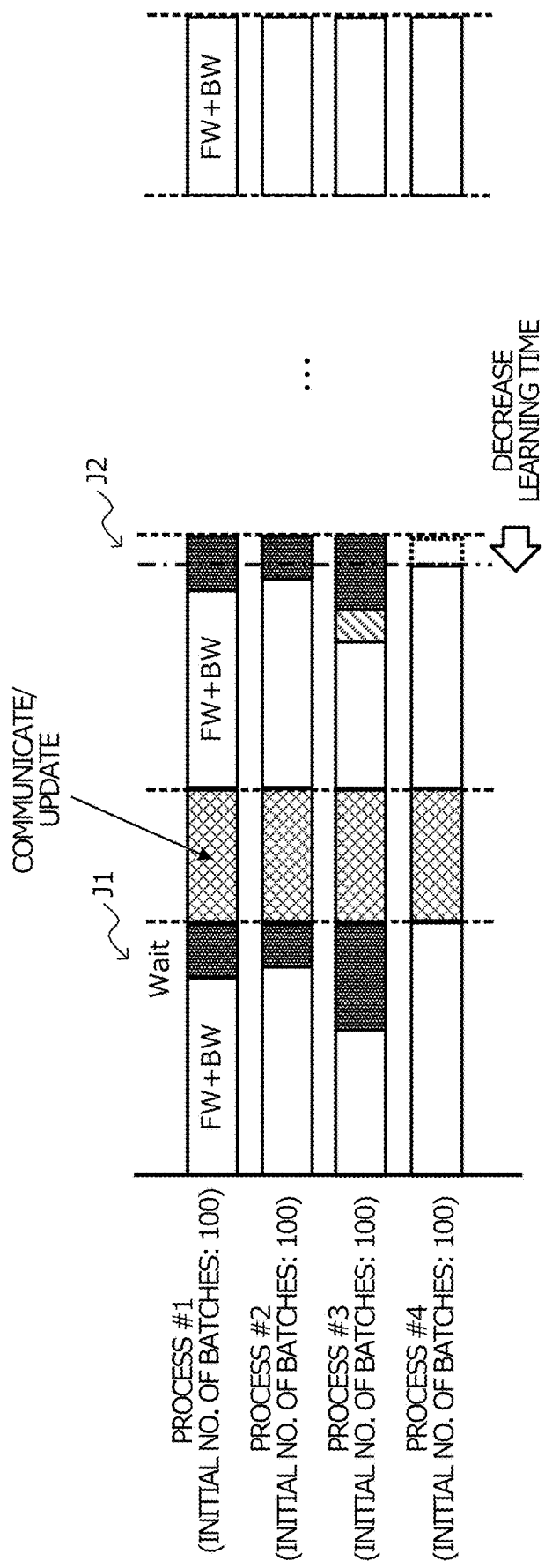
FIG. 17 is a diagram explaining the optimization process for the number of batches as a second modification example.

FIG. 17 is a diagram explaining the optimization process for the number of batches as a second modification example.

According to the second modification example, the following process is periodically performed: the batch size of a process of the longest wait time (for example, a process performed quickly) is increased by an arbitrary size k; and the batch size of a process of no wait time (for example, a process performed slowly) is decreased by k. The number of batches in each of the processes converges to an optimum value by repeatedly performing the optimization process.

In an example illustrated in FIG. 17, as indicated by a reference sign J1, the wait time in the process #3 is the longest, and there is no wait time in the process #4. Thus, the batch size in the process #3 is increased by k, and the batch size in the process #4 is decreased by k. This may reduce learning time in each of the processes.

The optimization process for the number of batches according to the second modification example may be combined with either or both of the optimization process for the number of batches in the example according to the embodiment and the optimization process for the number of batches according to the first modification example. For example, after the batch numbers of the processes have been roughly allocated in the batch number optimization process in the example according to the embodiment, the batch numbers may be aimed to be optimized by the optimization process for the number of batches in the second modification example.

Figure 18:
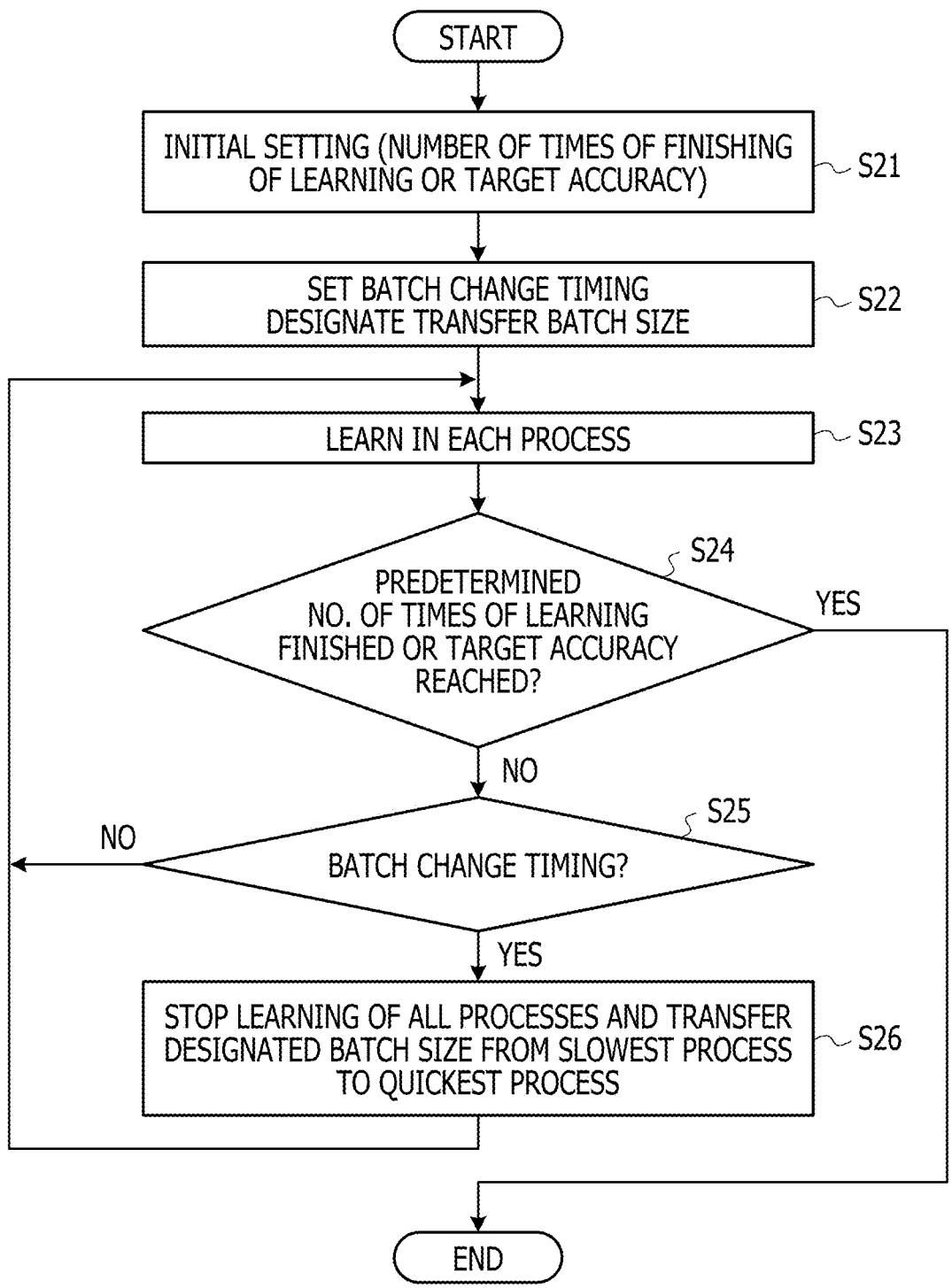
FIG. 18 is a flowchart explaining the optimization process for the number of batches as the second modification example.

The optimization process for the number of batches as the second modification example will be described with reference to a flowchart (steps S21 to S26) illustrated in FIG. 18.

The batch processing unit 113 performs the initial setting of, for example, the number of times of learning process or target accuracy (step S21).

The allocation processing unit 112 sets the batch change timing and a transfer batch size (step S22). The batch change timing may be reached every time the number of times of repetitions of learning reaches, for example, 100 times, every time the length of time of the learning reaches, for example, 30 minutes, or timing at which the wait time exceeds a threshold. The transfer batch size refers to a batch size to be moved from a process of no wait time (for example, a process performed slowly) to a process of the longest wait time (for example, a process performed quickly).

The batch processing unit 113 performs the learning in each of the processes (step S23).

The batch processing unit 113 determines whether the learning has been performed a predetermined number of times or target accuracy has been reached (step S24).

When the learning has been performed the predetermined number of times or the target accuracy has been reached (see a YES route in step S24), the optimization process for the number of batches as the second modification example ends.

In contrast, when the learning has not been performed the predetermined number of times and the target accuracy has not been reached (see a NO route in step S24), the allocation processing unit 112 determines whether the batch change timing has been reached (step S25).

When the batch change timing has not been reached (see a NO route in step S25), the processing returns to step S23.

In contrast, when the batch change timing has been reached (see a YES route in step S25), the allocation processing unit 112 stops the learning of all the processes and transfers a designated number of batches from a process of a slowest processing speed to a process of a quickest processing speed (step S26). Then, the processing returns to step S23.

[E] EFFECTS

Figure 19:
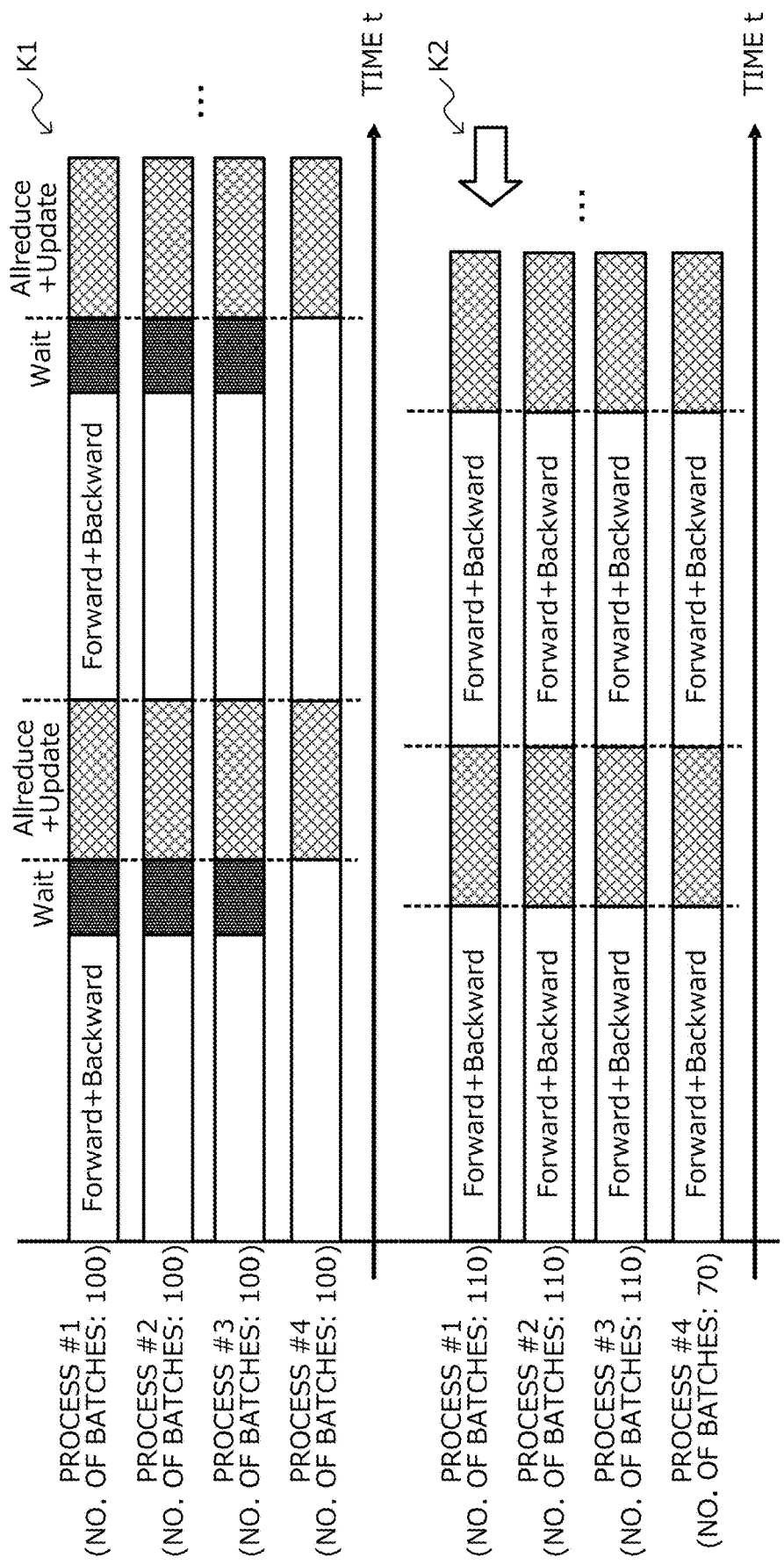
FIG. 19 is a diagram explaining the effects produced by the optimization process for the number of batches as the example according to the embodiment and each of the modification examples.

FIG. 19 is a diagram explaining the effects produced by the optimization process for the number of batches as the example according to the embodiment and each of the modification examples.

When the learning is performed by using a plurality of processes, the waiting time for communication may be decreased, and accordingly, the entire learning time may be decreased by adjusting the numbers of mini-batches of the individual processes in accordance with the throughputs.

In an example illustrated in FIG. 19, as indicated by a reference sign K1, the number of batches of 100 is allocated to each of the processes. There is a wait time in the processes #1 to #3 but there is no wait time in the process #4. Thus, as indicated by a reference sign K2, the processing time of the entirety of the processes may be decreased by increasing, to 110, the number of batches of the processes #1 to #3 in which the wait time is generated and decreasing, to 70, the number of batches of the process #4 in which the wait time is not generated.

With the programs, the calculator 1, and a method of learning in the example according to the above-described embodiment and each of the above-described modification examples, for example, the following operational effects may be obtained.

The measurement unit 111 measures the performance of each of the nodes as a single unit in learning performed by using a plurality of nodes in deep learning. The allocation processing unit 112 allocates batches in accordance with the ratio of the measured performance of each of the nodes in learning performed by using the plurality of nodes in deep learning. The batch processing unit 113 processes the allocated batches in the individual nodes.

This may decrease the standby time until the start of sharing of processing results between the nodes in parallel computation.

The allocation processing unit 112 performs allocation in accordance with the performance ratio. This may allow an efficient allocation of the number of batches.

The allocation processing unit 112 measures the performance every time a predetermined number of times of repetitions about the learning is reached and performs the allocation. The allocation processing unit 112 measures performance at predetermined time intervals and performs the allocation. Thus, even when the temperature of the CPU 11 changes or a usage tendency of the calculator 1 changes over time, the performance may be accurately measured and batches may be allocated.

The allocation processing unit 112 performs the allocation by decreasing the batches set for the node of the lowest performance by a predetermined size and increasing the batches set for the node of the highest performance by the predetermined size. This may allow a delicate allocation of the number of batches.

[F] OTHERS

The disclosed technique is not limited to the above-described embodiment. The disclosed technique may be carried out with various modifications without departing from the gist of the present embodiment. The configurations and the processes of the present embodiment may be selected as desired or may be combined as appropriate.

In the example according to the above-described embodiment and the above-described modification examples, the number of batches is allocated in accordance with the measurement result of the throughput. However, this is not limiting. For example, a clock of a CPU 11 or the GPU may be monitored, and the number of batches may be allocated in accordance with a monitoring result of the clock.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a program for causing a computer to execute a process, the process comprising:

measuring, in learning performed by using a plurality of nodes, each node of the plurality of nodes having a processing chip in deep learning, performance of each of the nodes;

after allocating a number of batches to be processed by an entirety of the plurality of nodes to each node of the plurality of nodes in accordance with a ratio of the respective performance measured, allocating by decreasing, by a predetermined size, the batches set for one of the nodes the performance of which is lowest and increasing, by the predetermined size, the batches set for one of the nodes the performance of which is highest; and processing the allocated batches in each node of the plurality of nodes.

2. The recording medium according to claim 1, wherein the measuring of the performance and the allocating are performed every time for a predetermined number of times of repetitions related to the learning is reached.

3. The recording medium according to claim 1, wherein the measuring of the performance and the allocating are performed at predetermined time intervals.

4. A calculator comprising:

a memory, and a processor coupled to the memory and configured to:

measure, in learning performed by using a plurality of nodes, each node of the plurality of nodes having a processing chip in deep learning, performance of each of the nodes;

after allocating a number of batches to be processed by an entirety of the plurality of nodes to each node of the plurality of nodes in accordance with a ratio of the respective performance measured, allocate by decreasing, by a predetermined size, the batches set for one of the nodes the performance of which is lowest and increasing, by the predetermined size, the batches set for one of the nodes the performance of which is highest; and process the allocated batches in each node of the plurality of nodes.

5. The calculator according to claim 4, wherein the measure of the performance and the allocating in accordance with ratio of the respective performance measured are performed every time a predetermined number of times of repetitions related to the learning is reached.

6. The calculator according to claim 4, wherein the measure of the performance and the allocating are performed at predetermined time intervals.

7. A deep learning method performed by a computer, the method comprising:

measuring, in learning performed by using a plurality of nodes, each node of the plurality of nodes having a processing chip in deep learning, performance of each of the nodes;

after allocating a number of batches to be processed by an entirety of the plurality of nodes to each node of the plurality of nodes in accordance with the respective performance measured, allocating by decreasing, by a predetermined size, the batches set for one of the nodes the performance of which is lowest and increasing, by the predetermined size, the batches set for one of the nodes the performance of which is highest; and processing the allocated batches in each node of the plurality of nodes.

8. The deep learning method according to claim 7, wherein
the measuring of the performance and the allocating in accordance with ratio of the respective performance measured are performed every time a predetermined number of times of repetitions related to the learning is reached.

9. The deep learning method according to claim 7, wherein
the measuring of the performance and the allocating in accordance with ratio of the respective performance measured are performed at predetermined time intervals.

* * * * *